Oct. 31, 1950   H. M. McCLURE   2,527,832
RULING OR LINING INSTRUMENT
Filed Feb. 16, 1946
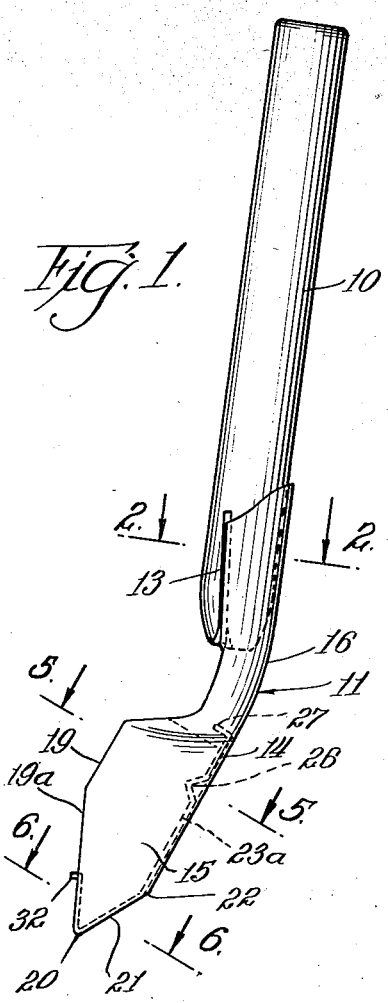
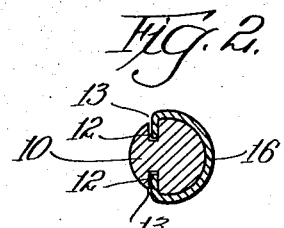
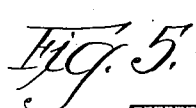
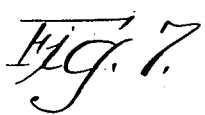
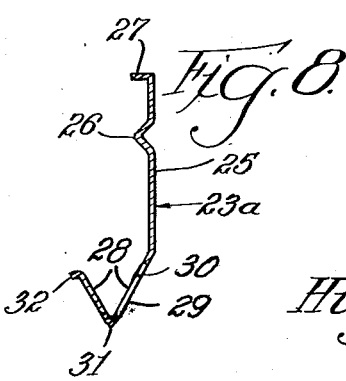
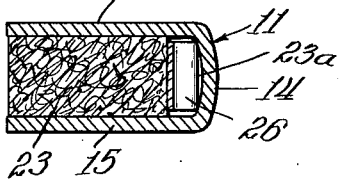
INVENTOR.
Hugh M. McClure
BY
Ahee & Hill
Att'ys.

Patented Oct. 31, 1950

2,527,832

UNITED STATES PATENT OFFICE 2,527,832

RULING OR LINING INSTRUMENT

Hugh M. McClure, Chicago, Ill., assignor to Keuffel & Esser Company, Hoboken, N. J., a corporation of New Jersey Application February 16, 1946, Serial No. 648,047

7 Claims. (Cl. 120—110)

1

This invention relates to a ruling or lining instrument and is in the nature of an improvement upon my pending application for patent on Ruling or Lining Instrument, Serial No. 607,-567, filed July 28, 1945, now Patent No. 2,464,763, March 15, 1949.

The principal object of the present invention is to provide at low cost a high quality precision ruling or lining instrument which will (1) guarantee the accuracy of the widths or "weights" of the lines designated to be drawn with it, (2) to insure the uniformity of lines drawn with the instrument or with identified duplicates thereof in any line width or "weight," (3) make possible the drawing of extraordinarily wide lines and the drawing of wide lines to extraordinary lengths with each filling, and to effect increased drafting room production through this instrument's greatly increased ink-holding capacity, resulting in greatly reduced lost time in re-filling operations.

Another object of the present invention is to save ink consumption and to avoid the objectionable shrinking effect in tracing paper, especially of too heavily spread ink, which results from the use of typical ruling pens set for extra wide lines.

In the pen of my pending application, the well known principle that opposing, keenly sharpened nibs or jaws separated from each other at a given distance will, in contact with the surface upon which a line is drawn with ink or other marking fluid, so confine the fluid between the sharpened nibs or jaws that a line is produced of exactly the same width or "weight" as the distance of separation of the nibs or jaws. The width of the lines drawn by said instrument was limited to approximately one-thirty-second of an inch, using India ink as it comes from the bottle and, in accordance with the present invention, the width or "weight" of the line can be increased to practically any desired width.

In the present ruling or lining instrument a large quantity of ink or other drawing fluid is carried between the nibs by an absorbent filler retained between the nibs by suitable means.

My ruling or lining instrument will retain at each filling, without danger of dripping, several times the quantity of ink or other marking fluid that can be retained by typical ruling instruments. This is due to the absorbent filler in which ink or ruling fluid may be carried up to the point of saturation.

The rate of flow of the ink which is stored at each filling in the absorbent filler to the point

2 of contact on the surface upon which the line is drawn is governed by the density and the nature of the material from which the absorbent filler is made. For example, a coarse steel wool filler will permit the ink to flow to the contact point of the instrument more rapidly than will a fine steel wool filler.

Metal wools in general will "feed" the ink faster to the point of contact than will animal wool or vegetable fillers. The desired rate of flow can be governed by the nature of the filler used.

It is intended to provide for this instrument a supply of a variety of insertable-removable absorbent fillers to suit the desires of the user.

With these and other objects and advantages in view, this invention consists in the several novel features hereinafter fully set forth and more particularly defined in the appended claims.

The invention is clearly illustrated in the accompanying drawing, in which:

Fig. 1 is a side elevation of a ruling or lining instrument illustrating a simple form of the present invention;

Fig. 2 is a cross section taken on the line 2—2 of Fig. 1;

Fig. 3 is a front elevation of the pen;

Fig. 4 is a rear elevation thereof;

Fig. 5 is a cross section taken on the line 5—5 of Fig. 1;

Fig. 6 is a cross section taken on the line 6—6 of Fig. 1;

Fig. 7 is a side elevation of an absorbent filler used in the instrument; and

Fig. 8 is a vertical longitudinal section of the filler retainer used.

Referring to said drawing, the reference character 10 designates the holder of the instrument which may comprise the conventional pen holder of the common and well known ruling or lining pen, and 11 designates the pen, constructed in accordance with the present invention, and secured to the pen holder as will be presently explained.

The pen is preferably made of high carbon hardened and tempered sheet steel and comprises a single piece of metal formed up from a blank by bending the blank upon itself midway between its side edges to form a U-bend, as is more fully explained in my pending application above referred to. The folded blank provides two spaced, similar, parallel nibs or jaws 15 and at one end of the nibs they merge into a curved neck or shank portion 16, preferably of semi-circular form and provided with inturned flanges 12 which seat in oppositely disposed grooves 13 formed in the pen handle. The grooves and flanges slant slightly with respect to the opposite curved wall of the neck so that when the latter is pushed upon the pen holder the latter is gripped between the flanges and opposite curved wall of the neck.

The side edges 19 of the nibs are substantially parallel with the edge of the U-bend 14 and from said edges 19 the side edges 19a slope to the point 20 of the pen point. The U-bend terminates at 22 and from the end of the U-bend the edges 21 of the nibs slope to the point 20 on the same angle as the edges 19a. The pointed ends of the nibs are sharpened, as by grinding or whetting to provide a sharpened point on each nib although, if desired, the points may be slightly dulled to avoid the danger of cutting through thin tracing paper and the like.

The inner faces of the nibs are parallel throughout their extent and are spaced apart the same distance as the width of the lines to be drawn by the instrument. The inner faces of the nibs always remain at this same distance and any sharpening of the points does not vary the distance between the points; consequently the width or "weight" of the lines drawn with the instrument always remains the same. The inner faces of the nibs may be spaced apart any desirable distance and the pens may be constructed in various sizes so as to produce lines of various widths.

Secured between the nibs of the pen is an absorbent filler 23 which is shaped to correspond generally with the shape of the nibs and is held therebetween by friction. A filler retainer 23a is provided which has a wall 25 extending across the space between the nibs at the U-bend thereof, and is provided along its length with a prong 26 which is thrust into the edge of the absorbent filler. Said wall 25 extends above the filler and has a laterally projecting finger 27 which overlies the filler.

The lower end of the filler retainer is of a V-shape formation, as shown at 28, extending between the nibs at their pointed ends, and the wall 29 thereof is provided with perforations or slots 30 extending almost but not quite to the pointed end of the filler retainer, through which perforations or slots the ink or other marking fluid may bleed and flow to the pointed end of the filler retainer, which pointed end is in the nature of a bar 31 which spreads the ink and applies it uniformly to the surface being ruled. The sharpened ends of the nibs confine the ink to the exact width or "weight" of the line. The free end of the V-formation of the filler retainer is preferably bent outwards slightly to form a finger tip 32, whereby the filler may be adjusted back and forth between the pen points.

The pen is filled with ink as by a small syringe and ink is introduced to the absorbent filler until it is practically saturated. As ink is applied to the surface by the bar, the ink in the absorbent filler flows toward the point, where the ink is being evacuated.

In case the absorbent filler becomes clogged by dry ink, it may be removed from the pen, together with the filler retainer and the used filler and replaced by a clean absorbent filler. The clean filler and filler retainer are then replaced in the pen.

In drawing lines with the present ruling or lining instrument, the flat outer face of the nib which contacts with the T-square or other straight edge aligns the pen with the T-square or other straight edge and the curved neck permits the pen to swivel between the fingers holding the pen handle, so that both nib points contact evenly with the surface being inked, thus insuring sharp edges on both sides of the lines drawn by the instrument.

The bar of the filler retainer acts as a spreader whereby the beginning and ending of lines drawn with the instrument are accurately straight and at right angles to the length of the drawn line.

Having thus described my invention, it is obvious that various immaterial modifications may be made in the same without departing from the spirit of my invention; hence, I do not wish to be understood as limiting myself to the exact form, construction, arrangement and combination of parts herein shown and described or uses mentioned.

What I claim as new and desire to secure by Letters Patent is:

1. A ruling or lining instrument comprising a pen composed of two spaced, similar, parallel nibs which taper along oblique lines to a point, an absorbent filler contained in the space between the nibs and a filler retaining element held between the nibs, said filler retaining element paralleling in part the edges of the nibs and being perforated adjacent the point, and said nibs merging into a portion for attachment to a pen holder.

2. A ruling or lining instrument comprising a pen composed of two spaced, similar, parallel nibs which taper along oblique lines to a point, an absorbent filler contained in the space between the nibs, a slotted filler retaining element held between the nibs, said filler retaining element being adjustable along the length of the nibs and being provided with a finger piece protruding from the pen, whereby the filler retaining element may be adjusted, and said nibs merging into a neck for attachment to a pen holder.

3. In a ruling or lining instrument, a ruling pen having two parallel spaced nibs each tapering to a point, an absorbent filler between said nibs, and a filler retainer having an apertured wall paralleling one of the tapered edges of the pen, said wall having an ink spreading bar disposed at the point of the pen.

4. A ruling or lining instrument for drawing lines of predetermined relatively great width comprising a pen composed of two substantially spaced parallel relatively extended similar nibs united along one edge, each nib being tapered to a point, the tapered edges of the two nibs near the point being free from each other and sharpened from the exposed surfaces of the nibs to a sharp edge at the parallel adjacent surfaces at least at said point, an ink retaining filler between said nibs, a filler retaining element held between said nibs, said filler retaining element being perforated adjacent said point, and means for attaching the pen to a handle.

5. A ruling or lining instrument for drawing lines of predetermined relatively great width comprising a pen composed of two substantially spaced parallel relatively extended similar nibs united along one edge, each nib being tapered to a point, the tapered edges of the two nibs near the point being free from each other and sharpened from the exposed surfaces of the nibs to a sharp edge at the parallel adjacent surfaces at least at said point, an ink retaining filler between the nibs, a slotted filler retaining element held between the nibs, said filler retaining element being adjustable along the length of the nibs and being provided with a finger piece protruding from the pen, whereby the filler retaining element may be adjusted, and means for attaching the pen to a handle.

6. A ruling or lining instrument for drawing lines of predetermined relatively great width comprising a pen composed of two substantially spaced parallel relatively extended similar nibs united along one edge, each nib being tapered to a point, the tapered edges of the two nibs near the point being free from each other and sharpened from the exposed surfaces of the nibs to a sharp edge at the parallel adjacent surfaces at least at said point, an ink retaining filler between the nibs, a filler retainer having an apertured wall paralleling one of the tapered edges of the pen, said wall having an ink spreading bar disposed at the point of the pen, and means for attaching the pen to a handle.

7. A ruling or lining instrument for drawing lines of predetermined relatively great width comprising a pen composed of two substantially parallel relatively extended similar nibs spaced from each other at greater than an ink retaining distance, means to hold said nibs in spaced parallel relation, each nib being tapered to a point, the tapered edges of the two nibs near the point being free from each other and sharpened from the exposed surfaces of the nibs to a sharp edge at the parallel adjacent surfaces at least at said point, a loosely formed filler absorbent to liquid India ink between the nibs and a perforated filler retainer extending between the nibs along the tapered edges of the nibs on both sides of the points.

HUGH M. McCLURE.

REFERENCES CITED

The following references are of record in the file of this patent:

UNITED STATES PATENTS

| Number | Name | Date |
| --- | --- | --- |
| 58,572 | Bobbitt | Oct. 9, 1866 |
| 519,953 | Henry | May 15, 1894 |
| 535,257 | Moore | Mar. 5, 1895 |
| 768,504 | Bagby | Aug. 23, 1904 |
| 826,399 | Ballance | July 17, 1906 |
| 839,164 | Lovering | Dec. 25, 1906 |
| 874,583 | Hays | Dec. 24, 1907 |
| 957,835 | Beaty | May 10, 1910 |
| 1,003,942 | Penn | Sept. 19, 1911 |
| 1,111,347 | Young | Sept. 22, 1914 |
| 2,216,259 | Wetterstrand | Oct. 1, 1940 |
| 2,464,763 | McClure | Mar. 15, 1949 |

FOREIGN PATENTS

| Number | Country | Date |
| --- | --- | --- |
| 7,976 | Great Britain | 1892 |